US005905252A

United States Patent [19]
Magana

[11] Patent Number: 5,905,252
[45] Date of Patent: May 18, 1999

[54] CARD GATE MECHANISM

[75] Inventor: Leroy Esteban Magana, Fontana, Calif.

[73] Assignee: ITT Manufacturing Enterprises, Inc., Wilmington, Del.

[21] Appl. No.: 08/976,947

[22] Filed: Nov. 24, 1997

[51] Int. Cl.$^6$ .................................................. G06K 13/00
[52] U.S. Cl. ........................ 235/475; 235/483; 235/485
[58] Field of Search .................................. 235/495, 475, 235/449, 483, 375, 379, 380, 451, 485

[56] References Cited

U.S. PATENT DOCUMENTS

| | | | |
|---|---|---|---|
| 3,766,687 | 10/1973 | Henson | 235/61.11 R |
| 3,850,299 | 11/1974 | Kreitzer | 235/61.7 |
| 4,833,310 | 5/1989 | Shimamura et al. | 235/492 |
| 5,017,764 | 5/1991 | Hashimoto | 235/454 |
| 5,045,674 | 9/1991 | Mita et al. | 235/475 |
| 5,061,842 | 10/1991 | Payne | 235/449 |
| 5,146,069 | 9/1992 | Orimoto et al. | 235/475 |
| 5,150,352 | 9/1992 | Kurihara | 235/475 |
| 5,179,504 | 1/1993 | Kitahara | 235/475 |
| 5,264,686 | 11/1993 | Kitahara | 235/475 |
| 5,331,138 | 7/1994 | Saroya | 235/492 |
| 5,360,969 | 11/1994 | Suzuki | 235/479 |
| 5,466,914 | 11/1995 | Kitahara | 235/483 |
| 5,484,989 | 1/1996 | Kumar et al. | 235/475 |
| 5,505,289 | 4/1996 | Watabe et al. | 194/206 |
| 5,532,466 | 7/1996 | Konno et al. | 235/472 |
| 5,640,307 | 6/1997 | Bleier et al. | 235/475 |

*Primary Examiner*—David P. Porta
*Assistant Examiner*—Diane I. Lee
*Attorney, Agent, or Firm*—Thomas L. Peterson

[57] ABSTRACT

Apparatus for use in an unsupervised public setting to receive a smart card so the card front portion can enter a card reader (20), which safeguards the card reader from vandalism. A card gate mechanism (30) includes a gate device (32) that is moveable between a closed position wherein it blocks the card path (16) and an open position which allows passage of the card to the card reader. At least one lever (34, 36, 38) has a card-engaging part (50, 52, 72) lying along the card path so the lever is deflected by the leading edge (46) of the card to release the gate device so it can open. Preferably, a plurality of card-engaging levers have card-engaging parts which must be deflected by the card leading edge to allow the gate to open, with at least one and preferably two of the levers deflected to the side of the card path by the leading edge of the card. The gate has a roller (100) that rolls along the top of the card when the gate is raised, to avoid scratching the card. A well (110) lies across the entire width of the card path between the card-passing slot and the gate device, to receive any debris that is inserted into the slot.

8 Claims, 3 Drawing Sheets

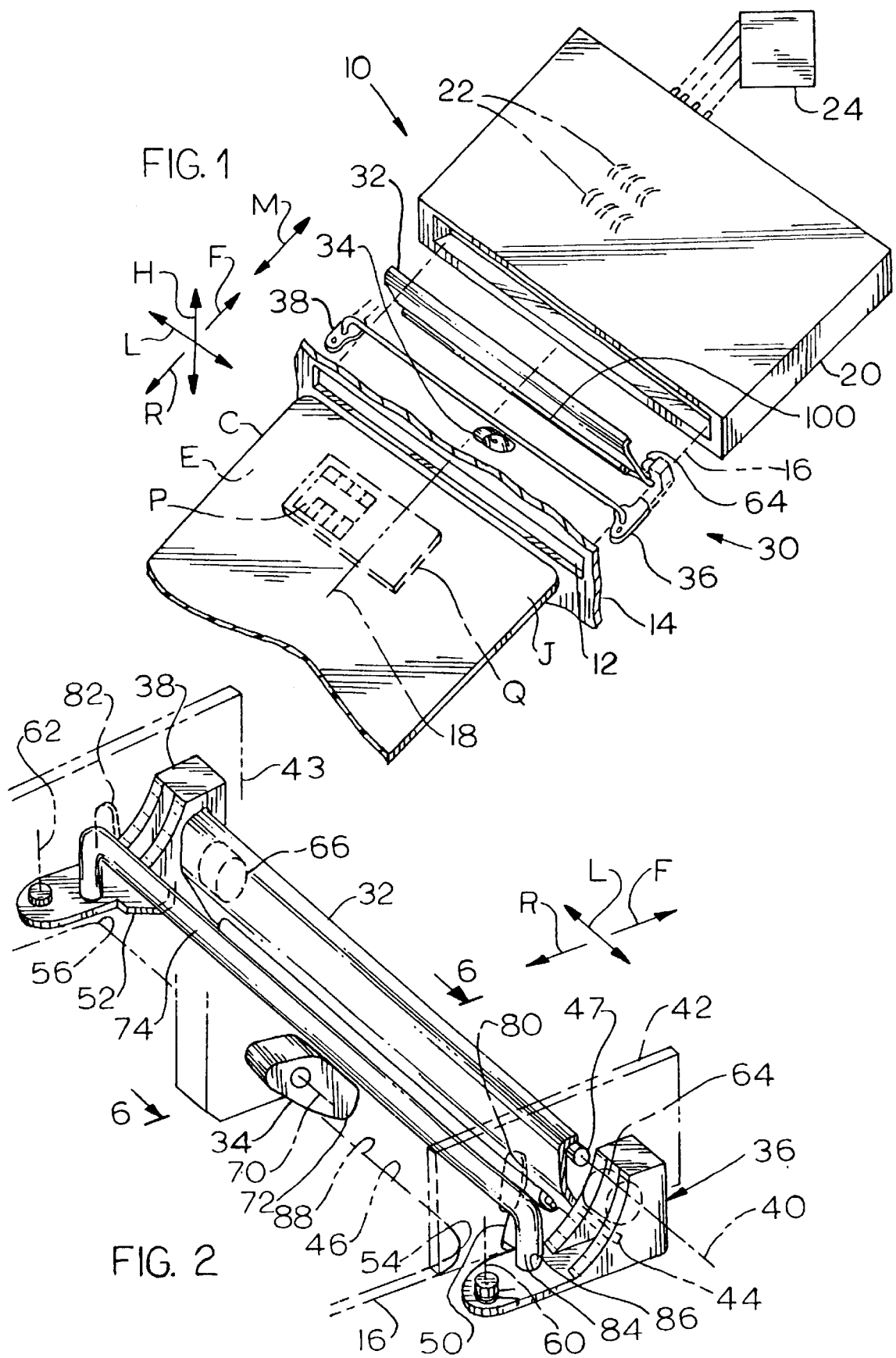

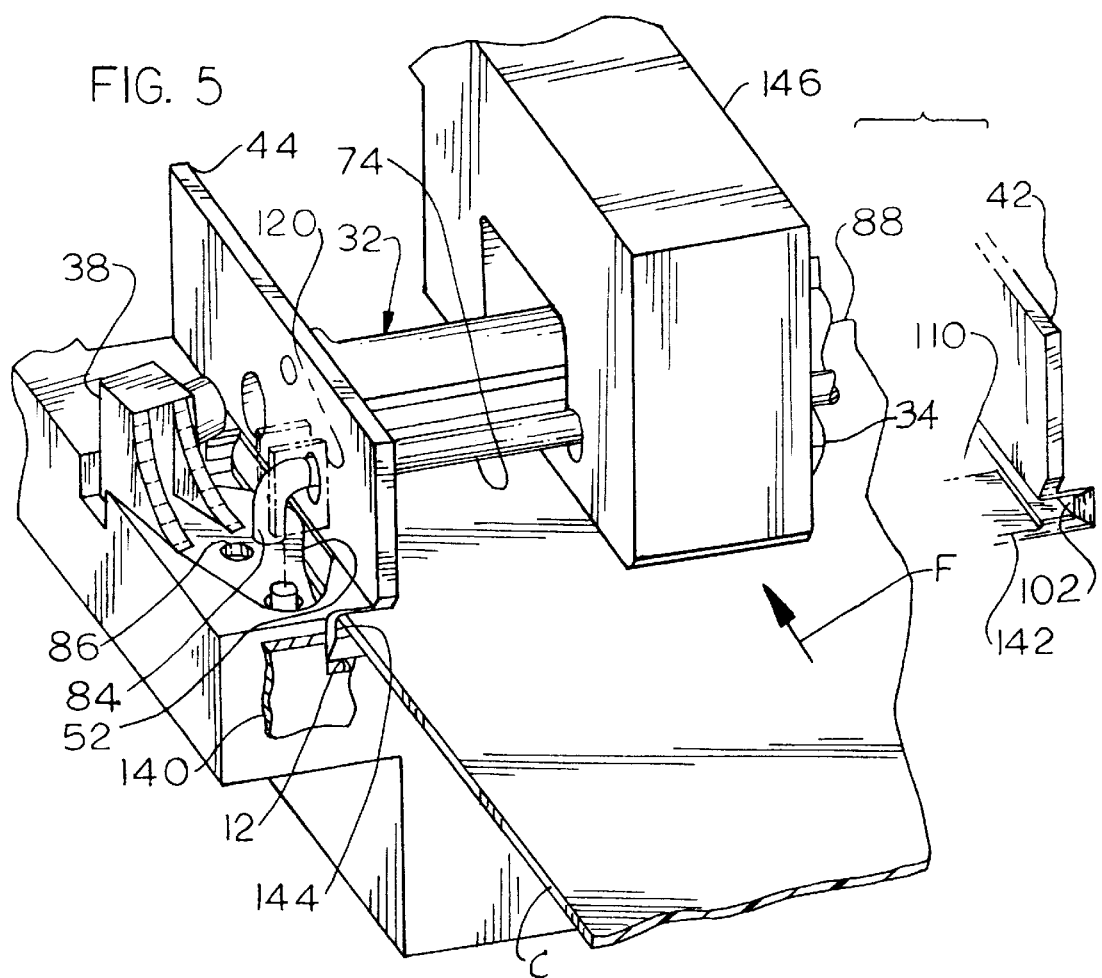
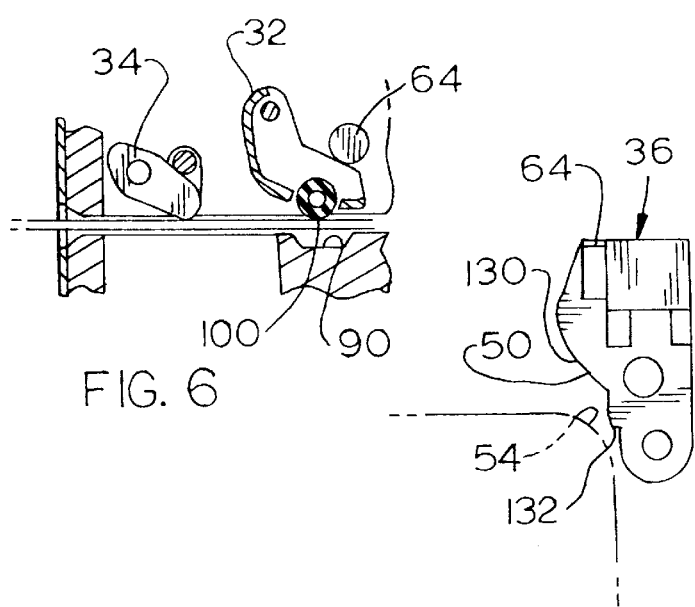

CARD GATE MECHANISM

BACKGROUND OF THE INVENTION

Cards that store data are becoming more popular, especially chip cards, or smart cards, that include an imbedded memory chip connected to pads on a surface of the card near its front end. A card reader assembly includes a housing with a slot that receives the card and a card reader that comprises contacts that engage the card pads. It is desirable to place some of such card reader assemblies in unattended public places, such as in pay telephones and product and money vending machines, where members of the public insert their own cards through the slots. However, there is a possibility of damage to the card reader assemblies by casual vandals. Such vandals may insert thin objects such as knives or keys, to see if they are able to make the assembly erroneously recognize a smart card and dispense goods, authorize a telephone call, etc. Also, polluters may insert objects such as gum wrappers into the card slot. It would be desirable if the assemblies could block the deep insertion of foreign objects, so they are prevented from reaching the card reader and damaging its pad-engaging contacts. Also, it would be desirable if the assembly were constructed to avoid obstruction of the card path by objects left therein by vandals or inserted therein by polluters.

SUMMARY OF THE INVENTION

In accordance with one embodiment of the present invention, apparatus is provided for blocking the passage of vandalizing instruments that are inserted into a card-receiving slot, so the instruments do not reach card reader contacts to damage them. The apparatus includes a card gate mechanism lying between the card-receiving slot and the card reader contacts, which includes a gate device that is normally in a closed position and in line with the card path to prevent the passage of instruments. At least one pivotally mounted lever has a card-engaging part lying along the card path at a position rearward of the card gate, to be engaged by the card leading edge prior to its engagement with the card gate device. The lever is coupled to the gate to prevent it from moving from a closed position to an open position, unless the card-engaging part of the lever is moved by the card. There are preferably a plurality of levers having card-engaging parts laterally spaced across the card path, so that at least two separate locations and preferably three must be pushed in order to release the gate. The gate can be separately pivoted out of the way by the leading edge of the card, but only if the card-engaging parts of the levers continue to be deflected when the gate is pushed to an open position.

A well has a top that lies between the card-receiving slot and the gate, with the upper end of the well extending along substantially the entire width of the card path. The well preferably extends at least one centimeter below the card path. Items such as coins and gum wrappers that have been protected through the card slot, drop into the well to prevent them from locking the card path for a legitimate card that is later inserted into the assembly.

The gate preferably includes an elastomeric roller that is positioned to roll against a surface of the card to keep the gate open while minimizing scratching of the card surface.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view showing parts of the card-receiver apparatus of the present invention, and a card that can be inserted therein.

FIG. 2 is an isometric view of some of the elements of the apparatus of FIG. 1.

FIG. 5 is an isometric view showing a portion of the apparatus of FIG. 2.

FIG. 6 is a sectional view taken on line 6—6 of FIG. 2, with the gate open.

FIG. 7 is a sectional view of a side lever and an end of the restraint bar, shown with the restraint bar initially lifted and the side lever not yet pivoted away from a lock position.

FIG. 8 is a view similar to that of FIG. 7, but after the side lever has been pivoted to a release position.

FIG. 9 is a plan view of one of the side levers of the apparatus of FIG. 2, and showing a portion of a card.

DESCRIPTION OF THE PREFERRED EMBODIMENTS

Figure 3:
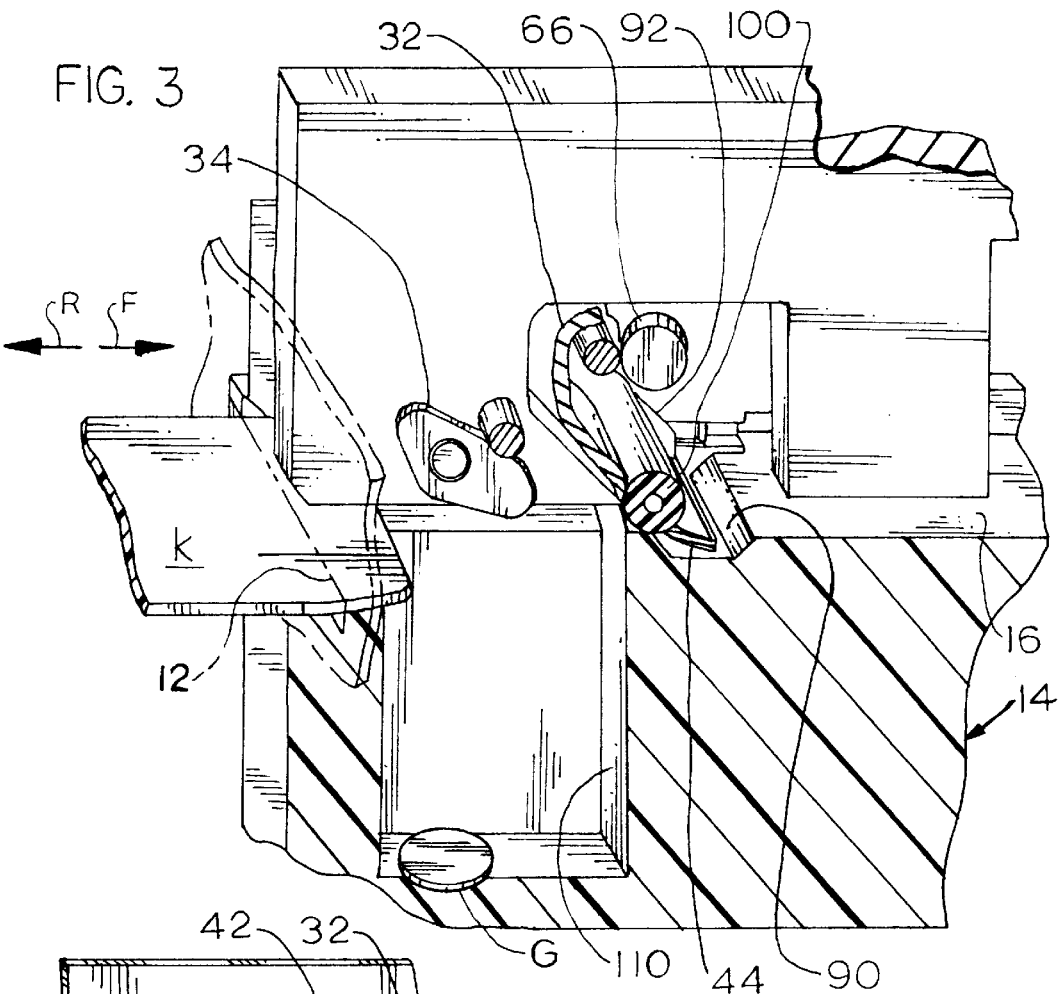
FIG. 3 is a sectional isometric view of a portion of the apparatus of FIG. 1, with the card only partially inserted along the card path and with the gate in its closed position.

FIG. 1 shows a card receiving assembly or apparatus 10 for receiving a smart card C. One standard (according to American National Standards Institute) smart card has a width in the lateral direction L of 85.6 mm and a thickness or height in the vertical direction H of about 0.84 mm. A group of contact pads P on the lower face E of the card provide access to an embedded IC memory chip Q. The memory is read out and/or read in, by inserting the card in the forward F longitudinal direction M through a card slot 12 in a housing 14 of the apparatus. When the card is inserted, its forward portion J moves forwardly along a card path 16 that has an axis 18 and to a card reader 20 that has contacts 22 for engaging the card pads. A switch lying about 1 mm rearward of the final position of the card leading edge, is activated by the card. This allows electronic circuitry 24 connected to the contacts 22 to at least read out information stored in the card. The apparatus 10 may be used to authorize placement of a telephone call, dispense goods or money, or otherwise provide authorizations.

Where the apparatus 10 is used in an unattended public location, it is possible for vandals to insert unauthorized instruments or objects through the card slot 12. Vandals may insert knives, keys, coins, etc. in an attempt to find a way to operate the card reader without an authorized card. If such instruments should reach the contacts 22, they may damage the contacts. Also, small instruments such as coins, toothpicks, or even gum wrappers inserted through the slot 12, could block the slot and prevent a standard card from being inserted all the way to the card reader.

In accordance with the present invention, applicant provides a card gate mechanism 30 that blocks the deep insertion of instruments, to the card reader along the card path 16, while allowing standard cards to be inserted therealong. The gate mechanism includes a gate or gate device 32 that normally blocks the card path, and three members in the form of levers 34, 36, 38 that prevent opening of the gate 32 unless the inserted object is similar to a standard card.

As shown in FIG. 2, the gate 32 is pivotally mounted about a lateral horizontal axis 40. The housing includes portions 42, 43 at opposite sides of the card path 16, with holes that receive the opposite ends of a gate pin 47 that is fixed to the rest of the gate. The gate has a lower portion 44 that swings forwardly and upwardly when the leading edge 46 of the card pushes it forwardly F, to allow the card to move under the raised and open gate.

Two of the levers 36, 38 are side levers that lie at laterally opposite sides of the card path 16. Each side lever has a card-engaging part 50, 52 which lies along the card path, near one side of it. When the card is pushed forwardly, opposite sides 54, 56 of its leading edge press forwardly and sidewardly against the card engaging parts 50, 52 of the side levers. This urges the side levers to pivot about vertical axes 60, 62 so the card-engaging parts 50, 52 move laterally or sideways out of the path of the card and allow the card to pass. If the side levers 36, 38 are pivoted about their vertical axes, then stops 64, 66 on the levers move out of the way of the gate lower portion 44 to allow the gate to pivot up to its open position. However, if the levers 36, 38 are not pivoted out of the way, they prevent the gate 32 from opening.

Another lever 34 is a middle lever that engages a portion of the card leading edge 46 that is between the sides 54, 56 of the leading edge. The middle lever 34 is pivotally mounted about an axis 70 that extends in the lateral direction L and that is horizontal when the card lies in a horizontal plane. The middle lever has a card-engaging part 72 that engages the middle portion 88 of the card leading edge, to cause the card-engaging part 72 to move forwardly and upwardly, out of the way of the card. When the middle lever part 72 pivots, it raises a restraint bar 74. The restraint bar extends through vertical slots 80, 82 in the housing portions 42, 44, to allow the bar to move up and down. When the restraint bar is down, its ends 84 lie in vertical holes 86 formed in the side levers 36, 38. As a result, unless the bar is lifted, the bar ends 84 prevent the side levers 36, 38 from pivoting about their vertical axes, thereby maintaining the stops 64, 66 in position to block opening of the gate.

FIG. 5 shows one of the side levers 38, after the restraint bar 74 has been lifted so its ends 84 have lifted substantially out of the bar receiving holes 86, and the side lever has been pivoted out of the way of the card C. After the middle portion 88 of the card leading edge has pivoted the middle lever 34 to raise the restraint bar 74, and the sides of the card leading edge have engaged the card-engaging parts of the side levers to pivot them to the position shown in FIG. 5, the gate 32 has been released so that the middle portion of the leading edge can pivot the gate to the raised and open position. Further forward movement of the card moves it to the card reader where the memory in the card can be read out.

Figure 4:
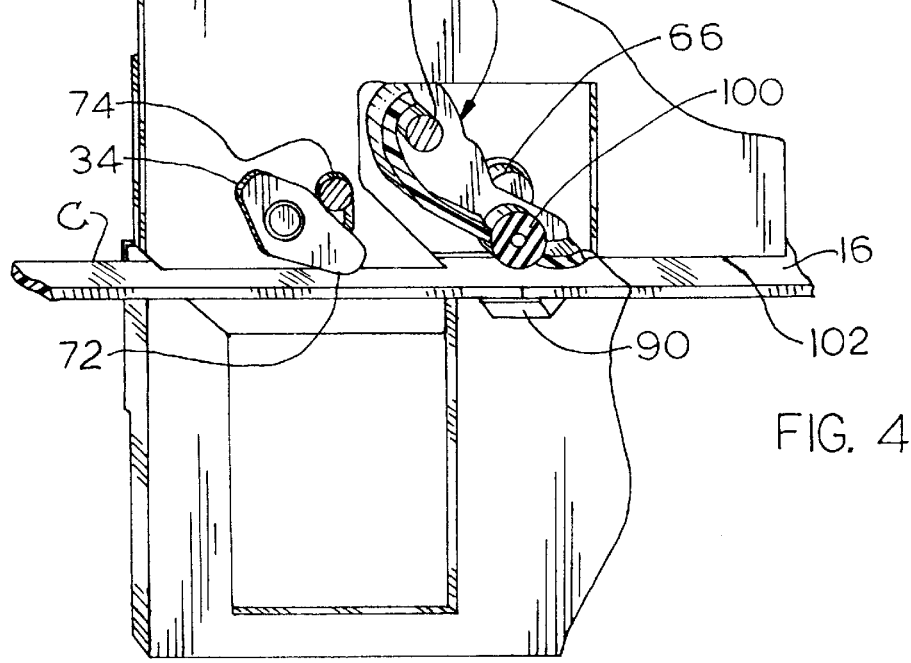
FIG. 4 is a view similar to that of FIG. 3, but with the card inserted further along the card path and with the gate in its open position.

FIGS. 3 and 4 show the gate 32 in the closed and open positions, respectively. In FIG. 3, the gate lower portion 44 lies in a recess 90 of the housing 40 so the gate extends at least partially vertically down across and below the card path. The side lever stop 66 is shown engaging a part 92 of the gate to prevent the gate from pivoting open. In FIG. 4, the card-engaging part 72 of the middle lever has been raised by the inserted card, to raise the restraint bar 74 and allow the side levers to be pivoted to their release positions. The card has raised the gate 32 and passes under it.

Applicant prefers to mount an elastomeric roller 100 on the gate 32, with the roller rolling against the card upper surface K, to avoid scratching it by the weight of the gate thereon. Another one or more similar rollers can be placed at the bottom of the card path 16 to support the card and prevent its bottom edge from being scratched. Actually, applicant prefers to use side edge guides 102 to guide and support the opposite lateral side edge portions of a card. Scratching of the side is not as deleterious as scratching of the middle portion of the card, which contains the contact pads and usually also contains letters and decorative emblems. Accordingly, it would be expected to be acceptable to provide an elastomeric roller 100 only at the upper face of the card which is being pressed down by the gate.

FIG. 3 shows that applicant provides a well 110 under the card path 16 and forward of the card slot 12. The well is provided to receive debris such as the coin G illustrated, gum wrappers, etc. that vandals and polluters may insert through the card slot 12. Such debris could otherwise block the portion of the card path lying forward of the gate 32 and prevent the subsequent insertion of a legitimate card. The well 110 extends along substantially the entire width of the card path 12 to catch almost any debris that might be inserted. The well 110 preferably has a depth of at least one centimeter, to receive coins and other similar debris so such debris is held out of line with the card path, and to hold such debris so it cannot be readily seen by a person peering through the card slot 12 who might otherwise try to insert instruments to retrieve the debris. Applicant notes that the smallest coin currently used in the U.S. is a ten cent piece, which has a width of 0.7 inch, so the well has a width and length that are each more than 0.7 inch.

FIG. 5 shows, in phantom lines, bar guides 120 that prevent pivoting of the bar guide. FIGS. 7 and 8 show a tapered bottom 122 at an end 84 of the restraint bar. When the bar is lifted by the middle lever, it initially rises to the position shown in FIG. 7, wherein its tapered lower end 122 lies slightly within the hole 86 in the side lever. However, when the side lever pivots to the position shown in FIG. 8, the walls of the hole slightly raise the bar end 84. This slight raising of the bar results in the weight of the bar resting on the side levers, instead of pushing down the middle lever and thereby causing the middle lever to press with considerable force against the upper face of the card. Thus, the tapered bottom serves as a means for decreasing (perhaps to zero) the force of the middle lever against the card. It is also possible to use a spring or counterweight to minimize any downward force of the restraint bar or middle lever.

FIG. 9 illustrates the shape of the side lever 36 and of its card-engaging part 50. The card engaging part includes an inclined surface 130 which is deflected by the side 54 of the card leading edge. Another location 132 is provided, which is likely to be encountered by the tip of knife inserted by vandals into the slot, with forces on the location 132 less likely to pivot the lever.

As shown in FIG. 5, the housing 14 can include a rear sheet of metal 140 that forms the card slot 12, and sturdy walls that form a tapered inlet 142 for guiding the card into the card path. The card slot closely receives the card, with the card slot height (at 12 or immediately forward thereof) being preferably no more than 2 or 3 mm for a card of 1 mm thickness. Card side guides 144 guide opposite sides of the card. A middle housing wall 146 and the housing parts 42, 44 support many of the components of the card gate mechanism.

The card is preferably supported along a few millimeters at its opposite edge portions by the guides 144, with a recess under the rest of the card. The roller 100 preferably presses against the card within a centimeter of each edge, so any downward force applied by the roller is applied near the card edge portion that is supported. The roller preferably extends across at least 80% of the card width (although there can be gaps at the middle of the roller).

A vandal who attempts to insert instruments such as knives, screw drivers, etc. to try to fool the machine, as to dispense merchandise or cash, is likely to insert the instrument and move it from side to side until he encounters obstacles. Such obstacles include the middle lever 34 and the opposite side levers, as well as the gate 32. The vandal may attempt to push the gate, and then push a lever forwardly or to one side as he pushes against the gate. Since a person only has two hands, it is difficult for a vandal to push more than one lever and the gate, or to push more than two levers and the gate. The fact that the levers are located both at opposite sides and at the middle, makes operation of the card gate mechanism confusing to a vandal.

A variety of card gate mechanisms can be used. For example, an additional side lever with a card-engaging part forward of the gate, can be used to further raise the gate after it has been first lifted by the card leading edge. The gate 32 and/or middle lever 34 can pivot so their card engaging parts can move forward and down instead of forward and up. The gate device can include two separate gates lying one in front of the other, or a pair of side levers lying one behind the other with card-engaging parts both lying rearward of the gate.

Although terms such as "up" and "down" have been used in the description, the apparatus can be used in any orientation with respect to the Earth.

Thus, the invention provides a card gate mechanism that includes a gate device lying between a card slot that closely receives a card of predetermined size (usually about 86 mm wide and about 1 mm thick) and the card reader that usually includes a plurality of contacts for engaging card pads on a surface of a card. It is noted that card reader contacts can be embedded in the same housing that forms the card slot so the contacts form the card reader. Also, magnetic stripe readers are available. The card gate mechanism includes at least one leading-edge member, in the form of a lever, that lies along the card path to be moved at least partially forward by the card leading edge. The member or lever is coupled to the gate device to allow the gate device to move to an open position only if the member is moved at least partially forward by the leading edge of the card. Applicant prefers a plurality of leading edge-engaging members, that each is coupled to the gate, with the gate opening only if all of the leading edge members have been moved by the card leading edge. One of the members such as a middle lever, can have its card-engaging part lying slightly rearward of the edge-engaging part of another lever such as a side lever, with the side lever being prevented from pivoting until the middle lever is first pivoted. The apparatus can include a well lying between the card slot and the gate to receive any debris inserted through the card slot. An elastomeric roller can be pivotally mounted on the gate to roll against a surface of the card.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for use with a card that has a card front portion with a leading edge, comprising:

a housing that forms a card slot that is a plurality of times wider in a lateral direction than in a perpendicular height direction and that is formed to receive said card front portion as it moves in a forward longitudinal direction, and said housing forming card path guides for guiding the card front portion along a path that extends forwardly from said card slot;

a card reader lying along said card path at a position forward of said card slot;

a card gate mechanism that includes a gate device that is moveable between a closed position wherein said gate device lies in line with said card path and longitudinally between said card slot and said reader to block forward movement of said card forward portion, and an open position out of line with said card path to allow the forward passage of the card forward portion to said reader, said card gate mechanism including a plurality of leading-edge engaging members that each has an edge-engaging part that lies along said card path to be moved at least partially forwardly by said card leading edge, with said parts being laterally spaced across said card path, with said leading edge members each coupled to said gate device to block movement of said gate device from said closed position and to allow said gate device to move to said open position only if said parts of all of said members are each moved at least partially forwardly by the leading edge of the card.

2. The apparatus described in claim 1 wherein:

said plurality of leading-edge engaging members includes at least three of such members, which all must be moved at least partially forward to allow said gate device to move to said open position.

3. Apparatus for use with a card that has a card front portion with a leading edge that has opposite sides, comprising:

a housing that forms a card slot that is a plurality of times wider in a lateral direction than in a perpendicular height direction and that is formed to receive said card front portion as it moves in a forward longitudinal direction, and said housing forming card path guides for guiding the card front portion along a path that extends forwardly from said card slot;

a card reader lying along said card path at a position forward of said card slot;

a card gate mechanism that includes a gate device that is pivotable about a primarily laterally-extending axis on said housing to move between a closed position wherein said gate device lies in line with said card path and longitudinally between said card slot and said reader to block forward movement of said card forward portion, and an open position out of line with said card path to allow the forward passage of the card forward portion to said reader, said card gate mechanism including at least one leading-edge engaging member that lies along said card path to be moved at least partially forwardly by said card leading edge, with said at least one member coupled to said gate device to block movement of said gate device from said closed position and to allow said gate device to move to said open position only if said member is moved at least partially forwardly by the leading edge of the card;

said at least one member includes a side lever which is pivotally mounted about a primarily vertical axis on said housing between lock and release positions with said side lever having a gate stop that lies in and out of the way of pivoting of said gate when said side lever is respectively in said lock position and in said release position;

said side lever has a card engaging part that lies in the path of a side of the card leading edge to be moved by said leading edge laterally out of the card path while pivoting said side lever to said release position.

4. Apparatus for use with a card that has a card front portion with a leading edge, comprising:

a housing that forms a card slot that is a plurality of times wider in a lateral direction than in a perpendicular height direction and that is formed to receive said card front portion as it moves in a forward longitudinal direction, and said housing forming card path guides for guiding the card front portion along a path that extends forwardly from said card slot;

a card reader lying along said card path at a position forward of said card slot;

a card gate mechanism that includes a gate device that is moveable between a closed position wherein said gate device lies in line with said card path and longitudinally between said card slot and said reader to block forward movement of said card forward portion, and an open position out of line with said card path to allow the forward passage of the card forward portion to said reader, said card gate mechanism including at least one leading-edge engaging member that lies along said card path to be moved at least partially forwardly by said card leading edge, with said at least one member coupled to said gate device to block movement of said gate device from said closed position and to allow said gate device to move to said open position only if said member is moved at least partially forwardly by the leading edge of the card;

said at least one member includes a middle lever which is pivotally mounted about a primarily horizontal axis between lock and release positions and which has a card engaging part which is positioned to be moved forwardly and vertically by the leading edge of the card to pivot the middle lever from said lock position to said release position, with said middle lever coupled to said gate to lock and release it.

5. The apparatus described in claim 4 wherein:

said gate is pivotable about a primarily laterally-extending axis on said housing;

said at least one member includes a side lever which is pivotally mounted about a primarily vertical axis on said housing between lock and release positions, with said side lever having a gate stop that lies respectively in and out of the way of pivoting of said gate in said lock and release position of said side lever;

said side lever has a card engaging part that lies in the path of a side of the card leading edge to be moved thereby laterally out of the card path while pivoting said side lever to said release position;

said card engaging part of said middle lever lies rearward of said card engaging part of said side lever, and including means for preventing pivoting of said side lever to said release position when said middle lever is in said lock position.

6. The apparatus described in claim 4 wherein:

said at least one member includes a side lever with a card engaging part lying forward of the card engaging part of said middle lever, said side lever being pivotable about a vertical axis; and including means coupling said side lever to said middle lever, to reduce the force of said middle lever card engaging part on said card when said side lever is pivoted by a card.

7. Apparatus for use with a card that has a card front portion with a leading edge, comprising:

a housing that forms a card slot that is a plurality of times wider in a lateral direction than in a perpendicular height direction and that is formed to receive said card front portion as it moves in a forward longitudinal direction, and said housing forming card path guides for guiding the card front portion along a path that extends forwardly from said card slot;

a card reader lying along said card path at a position forward of said card slot;

a card gate mechanism that includes a gate device that is moveable between a closed position wherein said gate device lies in line with said card path and longitudinally between said card slot and said reader to block forward movement of said card forward portion, and an open position out of line with said card path to allow the forward passage of the card forward portion to said reader, said card gate mechanism including at least one leading-edge engaging member that lies along said card path to be moved at least partially forwardly by said card leading edge, with said at least one member coupled to said gate device to block movement of said gate device from said closed position and to allow said gate device to move to said open position only if said member is moved at least partially forwardly by the leading edge of the card;

said gate device is pivotable about a primarily laterally-extending axis, and said gate includes an elastomeric roller that is positioned to roll against a card moving along said card path when the gate is open.

8. The apparatus described in claim 7 wherein:

said card has laterally opposite edge portions with laterally opposite edges, and said card path guides engage only said card edge portions;

said roller has laterally opposite roller ends that each presses against a portion of the card that lies within one centimeter of a lateral edge of the card.

* * * * *